(12) United States Patent
Suzuki et al.

(10) Patent No.: US 12,490,674 B2
(45) Date of Patent: Dec. 9, 2025

(54) CONTROL DEVICE AND WORK VEHICLE

(71) Applicant: Yanmar Holdings Co., Ltd., Osaka (JP)

(72) Inventors: Hidetaka Suzuki, Okayama (JP); Masaaki Murayama, Okayama (JP); Yuji Yamaguchi, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 217 days.

(21) Appl. No.: 18/120,400

(22) Filed: Mar. 12, 2023

(65) Prior Publication Data

US 2023/0311654 A1 Oct. 5, 2023

(30) Foreign Application Priority Data

Mar. 30, 2022 (JP) ................. 2022-055663

(51) Int. Cl.
*A01D 41/127* (2006.01)
*B60K 35/22* (2024.01)
(Continued)

(52) U.S. Cl.
CPC ..... *A01D 41/1272* (2013.01); *A01D 41/1274* (2013.01); *B60K 35/22* (2024.01); *B60K 35/60* (2024.01); *B60K 35/80* (2024.01); *B60K 35/90* (2024.01); *G05D 1/0094* (2013.01); *A01D 41/02* (2013.01); *B60K 35/10* (2024.01);
(Continued)

(58) Field of Classification Search
CPC .... A01B 69/007; A01B 69/008; A01D 41/02; A01D 41/127; A01D 41/1272; A01D 41/1274; A01D 41/1278; B60K 2360/166; B60K 35/00; B60K 35/10; B60K 35/22;
(Continued)

(56) References Cited

U.S. PATENT DOCUMENTS 11,656,621 B2  5/2023  Takai et al.

FOREIGN PATENT DOCUMENTS

JP  2009044995 A  3/2009
JP  2017158519 A  9/2017
(Continued)

OTHER PUBLICATIONS

Notice of Reasons for Refusal—Patent Application No. JP 2022 to 055663, Proposed Date: May 30, 2025.

*Primary Examiner* — Charles J Han
(74) *Attorney, Agent, or Firm* — Chris Mizumoto

(57) ABSTRACT

A control portion includes a vehicle-position acquiring portion, a field-contour setting portion, a region setting portion, and a display processing portion. The vehicle-position acquiring portion acquires position information indicating a position of the combine harvester traveling on a field. The field-contour setting portion sets a contour of a field on the basis of a plurality of pieces of the position information. The region setting portion sets a region not subject to a work indicating a region which is not a target for the work by the combine harvester inside the field or outside the field on the basis of the contour. The display processing portion causes a field image showing the field and an identification image for identifying the region not subject to the work, to be displayed on a display portion.

8 Claims, 8 Drawing Sheets

(51) Int. Cl.
    *B60K 35/28*     (2024.01)
    *B60K 35/60*     (2024.01)
    *B60K 35/80*     (2024.01)
    *B60K 35/81*     (2024.01)
    *B60K 35/90*     (2024.01)
    *G05D 1/00*     (2006.01)
    *A01D 41/02*     (2006.01)
    *B60K 35/10*     (2024.01)

(52) U.S. Cl.
    CPC .............. *B60K 35/28* (2024.01); *B60K 35/81* (2024.01); *B60K 2360/166* (2024.01)

(58) Field of Classification Search
    CPC ........ B60K 35/28; B60K 35/60; B60K 35/80; B60K 35/81; B60K 35/90; G05D 1/0044
    See application file for complete search history.

(56) References Cited

FOREIGN PATENT DOCUMENTS

| | | | | |
|---|---|---|---|---|
| JP | 2018101213 | A | 6/2018 | |
| JP | 2021007313 | A | 1/2021 | |
| JP | 2021086212 | A | 6/2021 | |
| WO | 2017159615 | A1 | 9/2017 | |
| WO | WO-2017154772 | A1 * | 9/2017 | ............. A01B 69/00 |

\* cited by examiner

CONTROL DEVICE AND WORK VEHICLE

CROSS-REFERENCE

This application claims foreign priority of JP2022-055663, filed Mar. 30, 2022, the disclosure of which is hereby incorporated by reference in its entirety.

TECHNICAL FIELD

The present invention relates to a control device and a work vehicle.

BACKGROUND ART

The mobile terminal in the field management system described in Patent Document 1 displays field information with respect to all or some of a plurality of fields on the basis of each of distances between each of positions of the plurality of fields acquired by using field position information and a position which is positioned by a positioning device mounted on a work vehicle or the mobile terminal.

PRIOR ART DOCUMENT

Patent Document

Patent Document 1: Japanese Unexamined Patent Application Publication No. 2019-024383

SUMMARY OF INVENTION

Technical Problem

For example, it becomes difficult for an operator to visually recognize information displayed on the mobile terminal depending on a type of field information displayed on the mobile terminal of Patent Document 1, a display format of the mobile terminal, the operator's situation and the like.

The present invention was made in view of the above-mentioned problems, and an object thereof is to provide a control device and a work vehicle for the operator to visually recognize various regions inside the field and outside the field more easily.

Solution to Problem

The control device according to the present invention includes a vehicle-position acquiring portion, a field-contour setting portion, a region setting portion, and a display processing portion. The vehicle-position acquiring portion acquires position information indicating a position of the work vehicle traveling on a field. The field-contour setting portion sets a contour of the field on the basis of a plurality of pieces of the position information. The region setting portion sets a region not subject to a work indicating a region which is not a target for the work by the work vehicle, inside the field or outside the field on the basis of the contour. The display processing portion causes a field image showing the field and an identification image for identifying the region not subject to the work, to be displayed on a display portion.

The work vehicle according to the present invention includes a control device, a traveling machine body, a traveling device, a reaping device, and a threshing device. The control device is disposed on the traveling machine body. The traveling device is disposed below the traveling machine body, supports the traveling machine body, and travels on the field. The reaping device is disposed on the traveling machine body and reaps unreaped grain culms in the field. The threshing device threshes reaped grain culms reaped by the reaping device The control device controls the traveling device, the reaping device, and the threshing device.

Advantageous Effects of Invention

According to the present invention, it becomes possible for the operator to visually recognize various regions inside the field and outside the field more easily.

DESCRIPTION OF EMBODIMENTS

Figure 1:
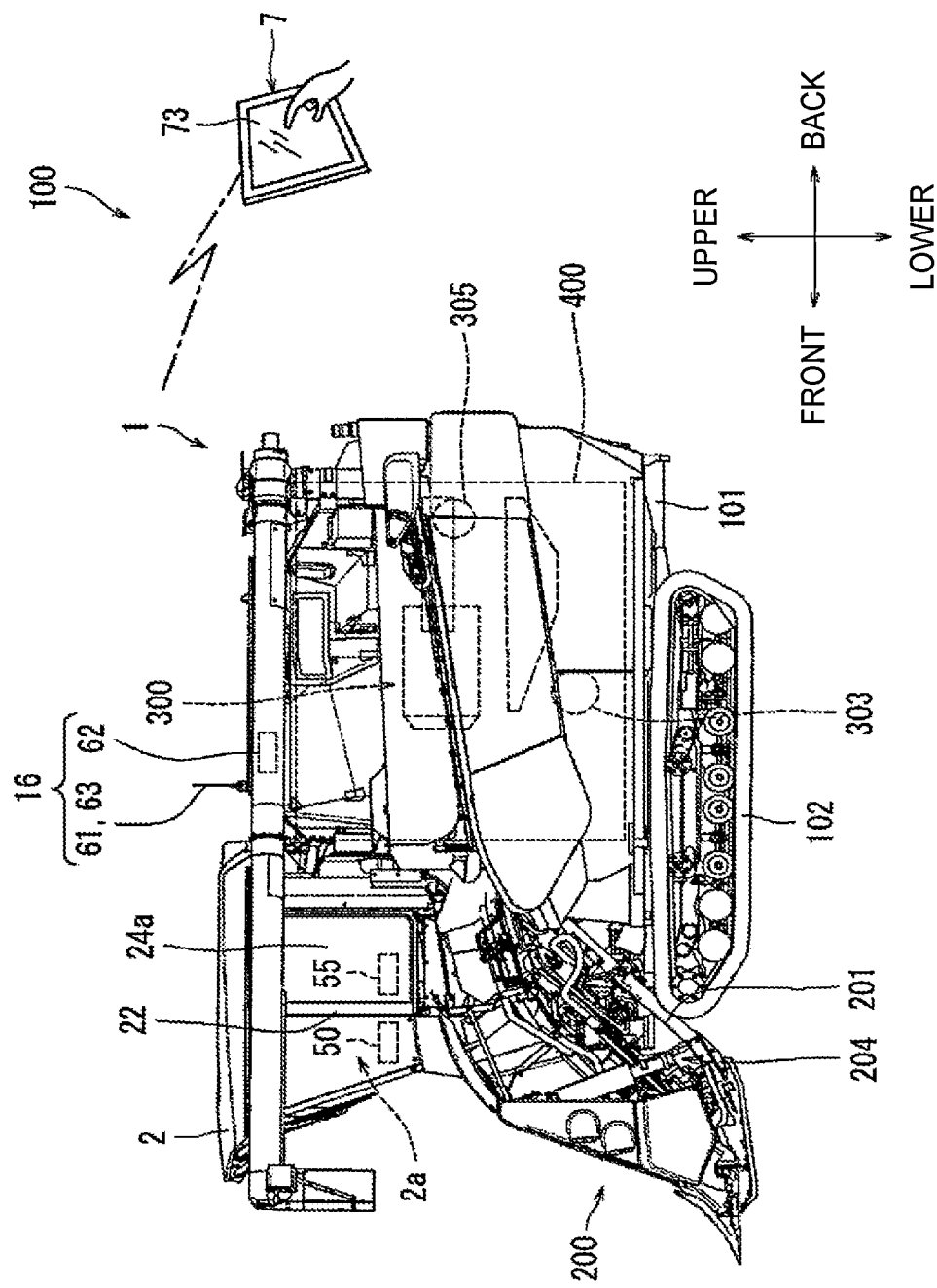
FIG. 1 is a schematic diagram of the crop harvesting system according to this embodiment.

An embodiment of the present invention will be described hereinafter with reference to the accompanying drawings. It is to be noted that, in the drawings, the same reference signs are used for the same or equivalent components, and repeated descriptions are omitted.

Figure 2:
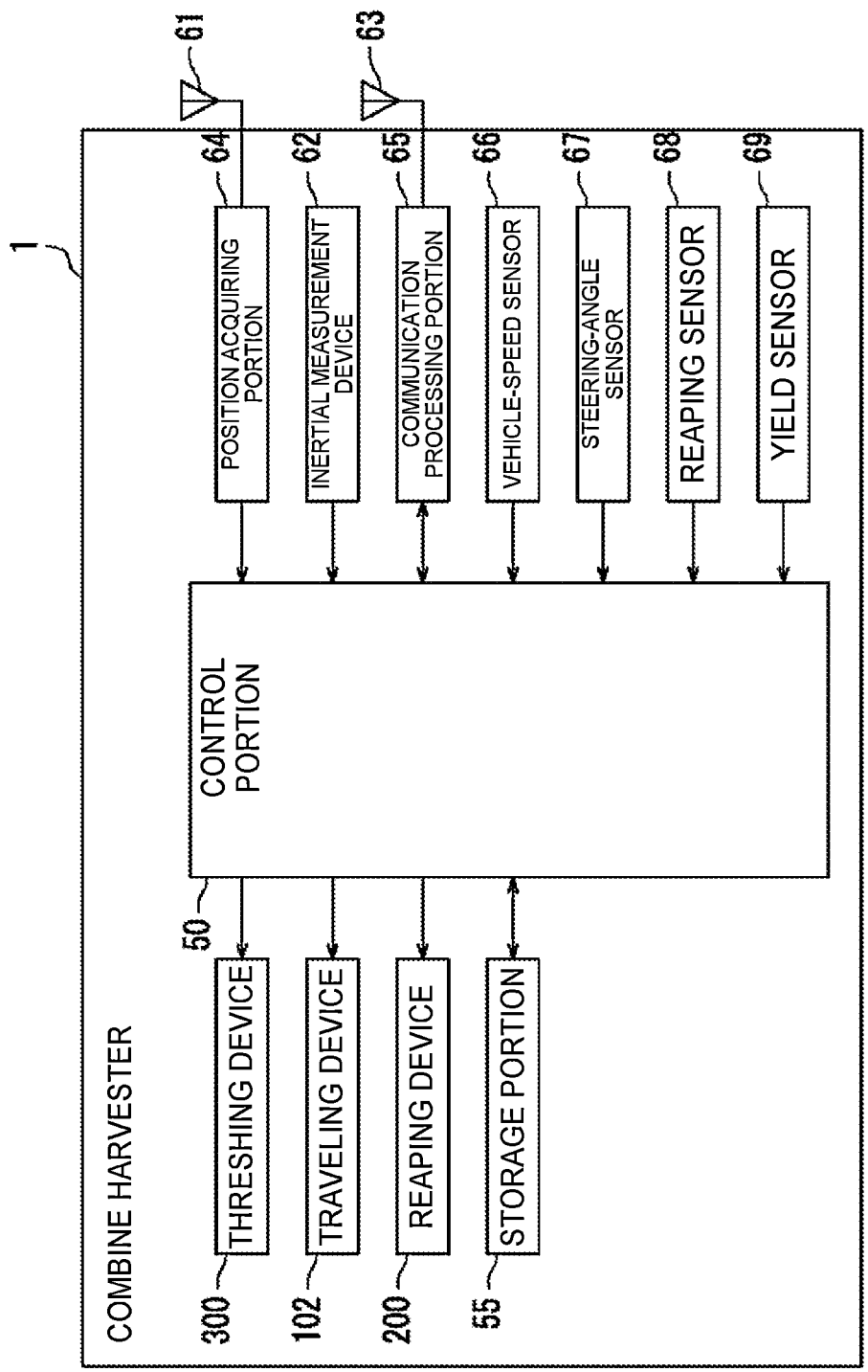
FIG. 2 is a block diagram of a combine harvester in this embodiment.
Figure 3:
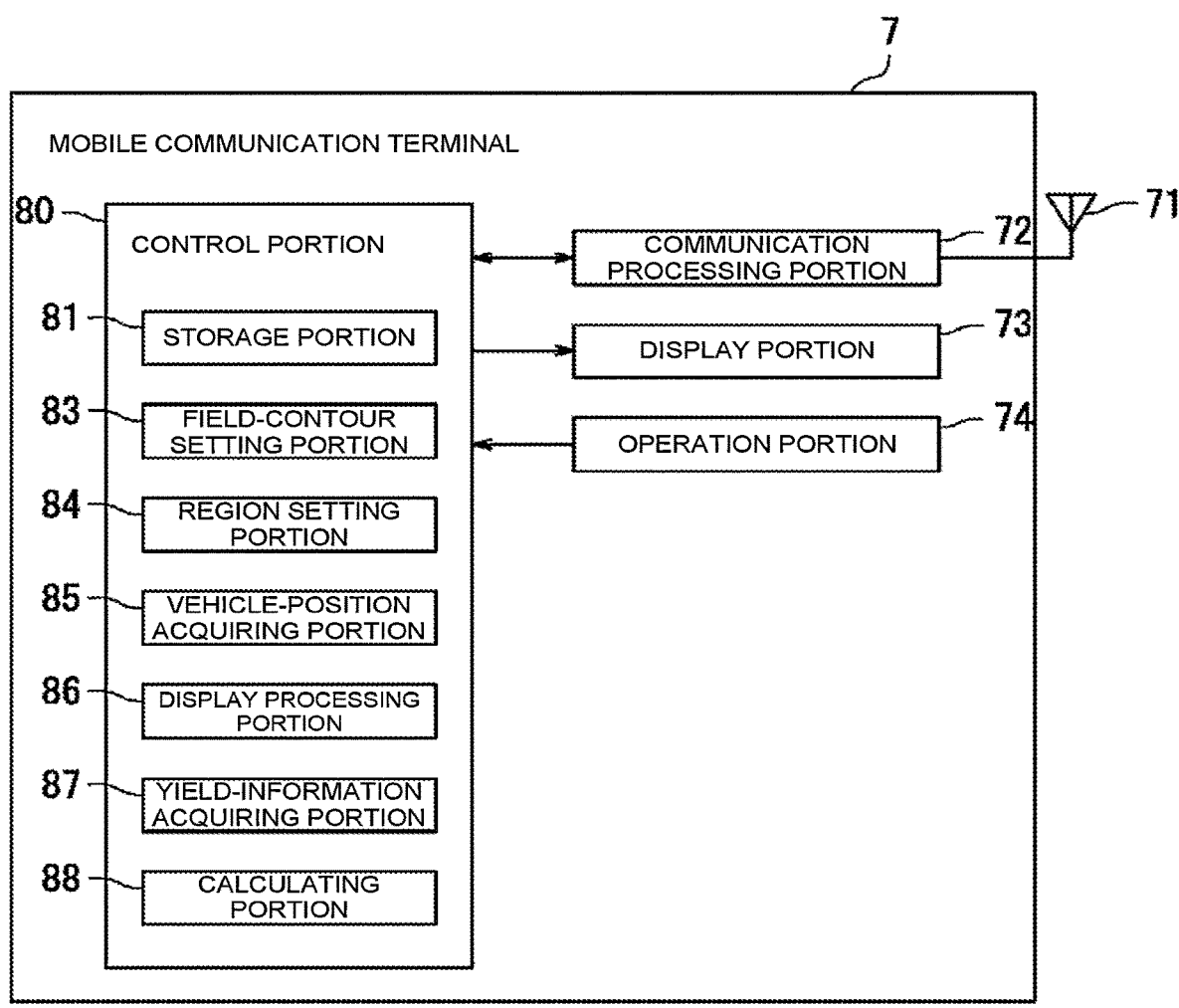
FIG. 3 is a block diagram of a mobile communication terminal in this embodiment.

By referring to FIGS. 1 to 3, a crop harvesting system 100 according to this embodiment will be described. FIG. 1 is a schematic diagram of the crop harvesting system 100 according to this embodiment. FIG. 2 is a block diagram of a combine harvester 1 in this embodiment. FIG. 3 is a block diagram of a mobile communication terminal 7 in this embodiment.

It is to be noted that, for ease of understanding, a front-back direction, a left-right direction, and an up-down direction may be described herein. Here, the front-back direction, the left-right direction, and the up-down direction are directions as viewed from a driver (operator) seated on a driver's seat (not shown) disposed in a driving space 2a (see FIG. 1). However, the front-back direction, the left-right direction, and the up-down direction are defined only for convenience of description and are not intended to limit directions of the work vehicle of the present invention in use and in assembling by the definition of these directions.

The crop harvesting system 100 includes a head-feeding combine harvester 1, which is a work vehicle, and a mobile communication terminal 7. The crop harvesting system 100 is an example of an automated traveling system in which an operator gives instructions using the mobile communication terminal 7 or the like and causes the combine harvester 1 to perform crop harvesting operation and the like while the combine harvester 1 is caused to perform automated travel. It is to be noted that an instruction of automated travel may be given not by the mobile communication terminal 7 but by operating an operation member provided on the combine harvester 1. The combine harvester 1 is an example of a work vehicle. The work vehicle is not limited to the combine harvester 1, but only needs to be a vehicle capable of automated travel in the field. The work vehicles include seeders that travel while sowing seeds in the field, fertilizers that travel while applying a fertilizer to the field, chemical sprayers that travel while spraying chemicals in the field, rice transplanters, cultivators, and tractors that travel while performing planting of seedlings and the like. The harvesting, seeding, fertilizing, chemical application, and planting works are examples of operations by the work vehicles.

The automated travel means that, by controlling a device related to traveling by a control portion 50 provided in the combine harvester 1, at least steering is autonomously performed so that a route specified in advance is followed. Besides, in addition to the steering, it may be so configured that a vehicle speed or a work by a work device or the like is autonomously performed. Automated travel includes a case where a person is on the combine harvester 1 and a case where no person is on the combine harvester 1.

As shown in FIG. 1, the combine harvester 1 in this embodiment includes a traveling machine body 101, a traveling device 102, a reaping device 200, a threshing device 300, a grain tank 400, a control portion 50, a storage portion 55, and a communication device 16. The traveling device 102 is disposed below the traveling machine body 101 and supports the traveling machine body 101. The reaping device 200 is disposed in front of the traveling machine body 101. The reaping device 200 and the threshing device 300 are examples of agricultural work devices. The communication device 16 is disposed above the traveling machine body 101. The control portion 50 is disposed inside the traveling machine body 101. The storage portion 55 is disposed inside the traveling machine body 101.

The traveling machine body 101 (combine harvester 1) includes an engine (not shown). The engine is a diesel engine, for example. The engine converts heat energy obtained by combusting fuel into kinetic energy (power).

The traveling device 102 causes the combine harvester 1 to travel. Specifically, the traveling device 102 travels on the basis of the power (kinetic energy) generated in the engine. The traveling device 102 includes, for example, a pair of left and right traveling crawler devices. The pair of left and right traveling crawler devices cause the combine harvester 1 to travel in the front-back direction. Moreover, the pair of left and right traveling crawler devices cause the combine harvester 1 to turn in the left-right direction.

The reaping device 200 is driven on the basis of the power (kinetic energy) generated in the engine. The reaping device 200 reaps unreaped grain culms in the field. In this embodiment, the reaping device 200 includes a reaping frame 201 and a grain-culm conveying device 204.

The reaping frame 201 is mounted on a front part of the traveling machine body 101, capable of elevating. A reaping blade is disposed below the reaping frame 201. The reaping device 200 reciprocally moves the reaping blade to cut a stubble of the unreaped grain culms in the field.

The grain-culm conveying device 204 conveys the reaped grain culms reaped by the reaping blade to the threshing device 300.

The combine harvester 1 can continuously reap the unreaped grain culms in the field by driving the reaping device 200 while moving in the field by driving the traveling device 102.

The threshing device 300 is driven on the basis of the power (kinetic energy) generated in the engine. The threshing device 300 threshes the reaped grain culms conveyed to the traveling machine body 101 by the grain-culm conveying device 204. The reaping work is included in the harvesting operation. The grain tank 400 stores grains threshed by the threshing device 300. Specifically, the threshing device 300 includes a winnowing fan 303 and a dust discharge fan 305. The threshing device 300 threshes ear ends of the reaped grain culms having been conveyed to the traveling machine body 101. The threshing device 300 performs swing sorting (specific gravity sorting) of the threshed ear ends (threshed product).

The winnowing fan 303 supplies sorting air toward the reaped grain culms after threshing. As a result, waste straw and foreign substances in the grains (threshed product) are removed. The grains from which the waste straw and foreign substances were removed are conveyed to the grain tank 400 for storage. The dust discharge fan 305 discharges dusts in a rear part of the grain-culm conveying device 204 to an outside of the machine body.

The traveling machine body 101 (combine harvester 1) further includes a cabin 2. The cabin 2 has a box shape, and the driving space 2a for the driver (operator) of the combine harvester 1 is formed inside the cabin 2. In the driving space 2a, equipment required for operating the combine harvester 1, such as the driver's seat, a steering wheel, a main gear-shift lever and the like, not shown, is disposed. For example, the steering wheel is disposed in front of the driver's seat. The steering wheel is operated by the driver (operator) seated on the driver's seat to change a direction in which the traveling device 102 shown in FIG. 1 travels. When a mode of the combine harvester 1 is a manual travel mode, the driver (operator) can turn the combine harvester 1 by operating the steering wheel. The turns include, for example, 90-degree turns (a turns), U-turns, and fishtail turns.

For example, the main gear-shift lever is disposed to the left of the driver's seat. The main gear-shift lever is operated by the driver (operator) seated on the driver's seat and switches the traveling direction of the traveling device 102 shown in FIG. 1 between forward and backward.

The main gear-shift lever has various switches. The various switches of the main gear-shift lever include, for example, a switch for adjusting a handling depth, a switch for raising the reaping device 200, a switch for lowering the reaping device 200, a switch for adjusting a height of the reaping device 200, and a switch for switching whether the power generated by the engine is transmitted to the reaping device 200 and the threshing device 300 or not. The steering wheel, the main gear-shift lever, and the various switches output signals indicating instruction contents in response to the operations by the driver (operator) to the control portion 50.

The communication device 16 has a positioning antenna 61, an inertial measurement device 62, and a communication antenna 63.

The positioning antenna 61 receives a radio wave (positioning signal) from a positioning satellite that configures a satellite positioning system (GNSS: Global Navigation Satellite System). The inertial measurement device 62 includes a 3-axis angular-speed sensor and a 3-way acceleration sensor.

The communication antenna 63 is an antenna for wireless communication with the mobile communication terminal 7. For the wireless communication, a wireless LAN (local area network) such as Wi-Fi (registered trademark) and a shortrange wireless communication such as Bluetooth (registered trademark) can be adopted. Moreover, in the combine harvester 1, an antenna for mobile communication (not shown) for communication using cellular phone lines and the Internet may be provided.

The control portion 50 controls the traveling device 102, the reaping device 200, and the threshing device 300. Specifically, as shown in FIG. 2, the control portion 50 is an arithmetic device such as a CPU (Central Processing Unit).

The control portion 50 receives the signals output from the steering wheel, the main gear-shift lever, the various switches and the like and controls the traveling device 102, the reaping device 200, and the threshing device 300 in accordance with the instructions indicated by the signals. The control portion 50 may be a single piece of hardware or a plurality of pieces of hardware capable of mutual communication.

The storage portion 55 is a main storage device such as a ROM (Read Only Memory) and a RAM (Random Access Memory). The storage portion 55 may further include an auxiliary storage device such as an HDD (Hard Disk Drive) or an SSD (Solid State Drive). In the storage portion 55, various programs and data and the like are stored. The control portion 50 reads various programs from the storage portion 55 and executes them.

Moreover, in addition to the inertial measurement device 62 described above, a position acquiring portion 64, a communication processing portion 65, a vehicle-speed sensor 66, a steering-angle sensor 67, a reaping sensor 68, and a yield sensor 69 are connected to the control portion 50.

The position acquiring portion 64 acquires the position of the combine harvester 1 as information of a latitude and a longitude, for example, by using the positioning signals received by the positioning antenna 61 from the positioning satellites. The position acquiring portion 64 may perform positioning by receiving a positioning signal from a reference station, not shown, by an appropriate method and then by using a well-known RTK-GNSS (Real Time Kinematic GNSS) method. The reference station is installed at a known position around the field. Alternatively, the position acquiring portion 64 may use the Differential DGNSS (Differential GNSS) method to perform the positioning. Alternatively, the position acquiring portion 64 may acquire a position on the basis of radio wave intensity, such as wireless LAN, or by inertial navigation using measurement results of the inertial measurement device 62.

The communication processing portion 65 transmits and receives data to and from the mobile communication terminal 7 via the communication antenna 63.

The vehicle-speed sensor 66 detects a vehicle speed of the combine harvester 1. The vehicle-speed sensor 66 is provided on an axle or the like disposed on the traveling device 102. When the vehicle-speed sensor 66 is provided on the axle of the traveling device 102, the vehicle-speed sensor 66 generates pulses according to rotation of the axle. Data of detection results acquired by the vehicle-speed sensor 66 is output to the control portion 50.

The steering-angle sensor 67 is installed on the steering wheel, for example, and detects the steering angle of the steering wheel. Data of the detection result acquired by the steering-angle sensor 67 is output to the control portion 50.

The reaping sensor 68 detects a height of the reaping device 200 and a driving status of the reaping device 200. Data of the detection results acquired by the reaping sensor 68 is output to the control portion 50. The control portion 50 can determine whether the reaping device 200 is performing a reaping work or not on the basis of the detection result of the reaping sensor 68. The reaping work is included in the harvesting operation.

The yield sensor 69 detects an amount of grains harvested by the combine harvester 1. The yield sensor 69 outputs information indicating the detected amount of grains to the control portion 50. For example, the yield sensor 69 is provided in the grain tank 400. The yield sensor 69 measures a degree of impact when grains hit the yield sensor 69 as the grains are conveyed to the grain tank 400 and outputs a measurement result to the control portion 50. The control portion 50 acquires the measurement result of the yield sensor 69 and converts it to a grain mass or volume to generate yield information indicating the amount of grains harvested by the combine harvester 1. The control portion 50 does not have to convert the measurement results of the yield sensor 69. In this case, the yield information indicates the measurement results of the yield sensor 69. The yield sensor 69 is not an indispensable constituent element of the crop harvesting system 100.

In this embodiment, the control portion 50 is capable of controlling the automated traveling of the combine harvester 1, such as vehicle-speed control and steering control. Specifically, the combine harvester 1 can move forward, backward, and turn or the like autonomously under the control of the control portion 50. The control portion 50 can also autonomously perform steering, for example, and at the same time, execute control of changing a vehicle speed in accordance with an operation by the operator.

When the vehicle speed is changed autonomously, the control portion 50 executes control such that the current vehicle speed detected by the vehicle-speed sensor 66 gets closer to a target vehicle speed. The control of the vehicle speed is realized by changing at least either one of a transmission ratio of a gearbox in a transmission case (not shown) and an engine rotation speed. It is to be noted that the control of the vehicle speed includes control of bringing the vehicle speed to zero so that the combine harvester 1 comes to a stop.

When steering is performed autonomously, the control portion 50 executes control of bringing a current steering angle detected by the steering-angle sensor 67 to get closer to a target steering angle. The control of the steering angle is realized, for example, by driving a steering actuator provided on a rotating shaft of the steering wheel. It is to be noted that, instead of driving of the steering actuator, the control portion 50 may adjust the turning angle of the traveling device 102 by directly adjusting the rotation of each of the left and right traveling crawler devices of the traveling device 102.

The control portion 50 also controls the operations of the reaping device 200 and the threshing device 300 on the basis of the predetermined conditions. Specifically, the control portion 50 controls height adjustment and a reaping work of the reaping device 200 and a threshing work by the threshing device 300.

It is to be noted that, on the basis of detection results of the various sensors, other than control related to the automated travel, control of the operations of the reaping device 200 and the threshing device 300, and determination on continuation of a harvesting operation, the control portion 50 can also execute control of causing the combine harvester 1 to travel, the control of the operations of the reaping device 200 and the threshing device 300, and the determination on the continuation of the harvesting operation in response to remote control by the operator using the mobile communication terminal 7.

Subsequently, by referring to FIG. 3, the mobile communication terminal 7 will be explained. As shown in FIG. 3, the mobile communication terminal 7 includes a communication antenna 71, a communication processing portion 72, a display portion 73, an operation portion 74, and a control portion 80. The mobile communication terminal 7 is a tablet device, a smartphone, a laptop computer or the like. The mobile communication terminal 7 executes various types of processing related to the automated travel of the combine harvester 1 as will be described later, while at least a part of such processing can be executed by the control portion 50 of the combine harvester 1. To the contrary, at least a part of the various types of processing related to the automated travel executed by the control portion 50 of the combine harvester 1 can be executed by the mobile communication terminal 7.

The communication antenna 71 is an antenna for conducting wireless communication with the combine harvester 1. The communication processing portion 72 transmits and receives data to and from the combine harvester 1 via the communication antenna 71. Specifically, the control portion 80 can receive, via the communication processing portion 72 and the communication antenna 71, the detection results and the like of each sensor provided in the combine harvester 1.

As described above, the combine harvester 1 can be connected to a cellular phone line and thus, the mobile communication terminal 7 can be connected to the cellular phone line via the combine harvester 1. Therefore, a part of information stored in the storage portion 55 of the combine harvester 1 or a storage portion 81 of the control portion 80, for example, can be stored in an external server. It is to be noted that the antenna for mobile communication (not shown) may be provided in the mobile communication terminal 7 instead of the combine harvester 1.

The display portion 73 is a liquid crystal display, an organic electroluminescence (EL) display or the like. The display portion 73 is capable of displaying information on the field, information on the automated travel, information on the setting of the combine harvester 1, detection results of the various sensors, warning information and the like, for example.

The operation portion 74 includes at least either one of a touch panel and hardware keys. The touch panel is disposed by overlapping the display portion 73 and can detect an operation by an operator's finger or the like. The hardware key is disposed on a side surface of an enclosure of the mobile communication terminal 7 or in a periphery of the display portion 73 or the like and can detect pressing by the user's finger or the like.

The control portion 80 includes an arithmetic device, an input/output portion and the like, not shown, and the storage portion 81. The control portion 80 is an example of a control device. The arithmetic device is a processor, a microprocessor or the like. The storage portion 81 is a main storage device such as a ROM and a RAM. The storage portion 81 may further include an auxiliary storage device such as an HDD or SSD. In the storage portion 81, various programs and data and the like are stored. The arithmetic device reads the various programs from the storage portion 81 and executes them. By means of cooperation between the hardware and software described above, the control portion 80 can be operated as a field-contour setting portion 83, a region setting portion 84, a vehicle-position acquiring portion 85, a display processing portion 86, a yield-information acquiring portion 87, and a calculating portion 88. The processing executed by the field-contour setting portion 83, the region setting portion 84, the vehicle-position acquiring portion 85, the display processing portion 86, the yield-information acquiring portion 87, and the calculating portion 88 will be described below.

Figure 4:
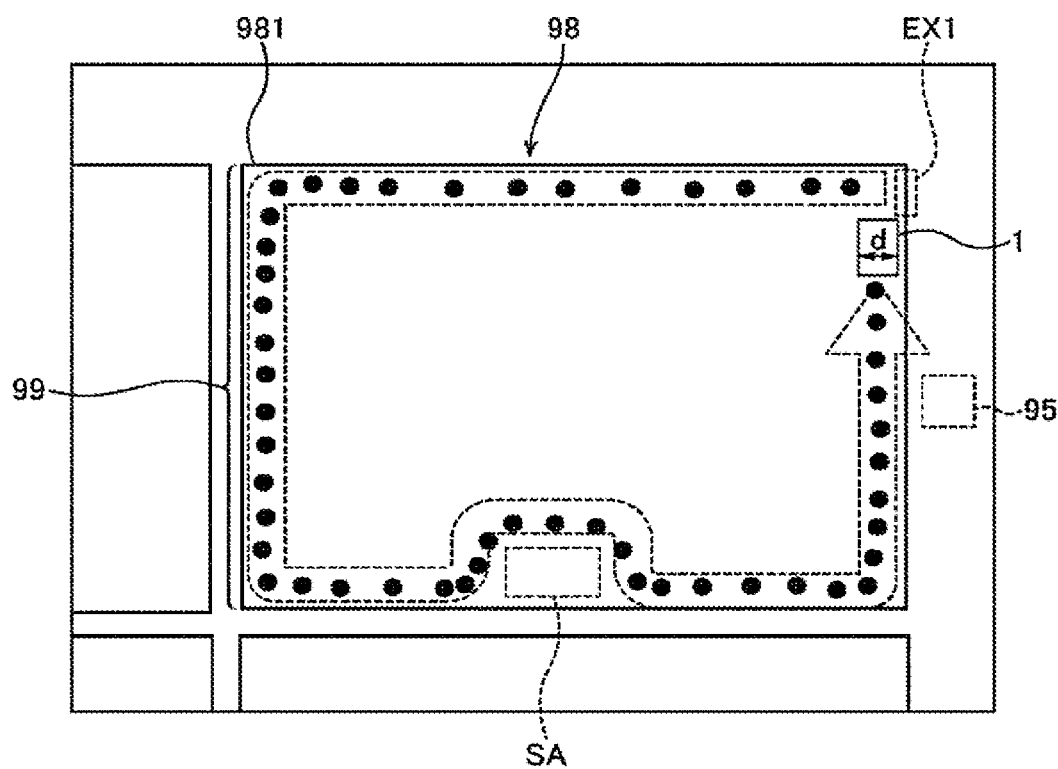
FIG. 4 is a diagram illustrating a field on which the combine harvester is traveling in this embodiment.
Figure 5:
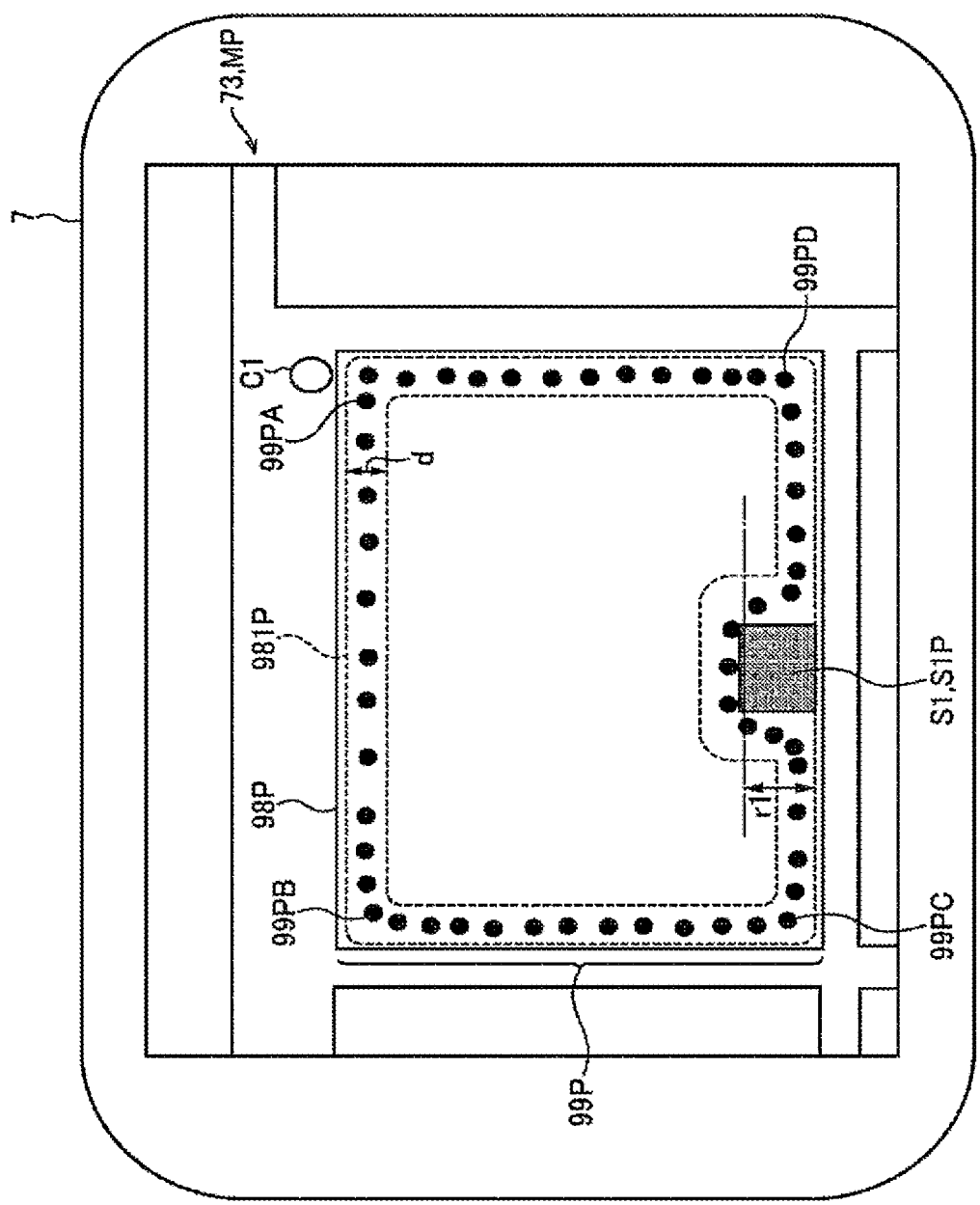
FIG. 5 is a diagram illustrating an example of a screen displayed on a display portion in this embodiment.

Subsequently, by referring to FIGS. 4 and 5, the automated travel of the combine harvester 1 in this embodiment will be explained. FIG. 4 is a diagram illustrating a field 98 on which the combine harvester 1 is traveling in this embodiment. FIG. 5 is a diagram illustrating an example of a screen displayed on the display portion 73 in this embodiment.

As shown in FIG. 5, the display portion 73 displays a map image MP showing the surroundings of the field 98. The map image MP includes a field image 98P showing the field 98. The map image MP may be stored in the storage portion 81, for example, or may be acquired from outside the mobile communication terminal 7 via cellular phone lines and the Internet. Specifically, the display processing portion 86 of the mobile communication terminal 7 acquires the map image MP including the field image 98P and causes the map image MP to be displayed on the display portion 73.

The display processing portion 86 also causes an icon C1 indicating the position of the combine harvester 1 to be displayed on the display portion 73. Specifically, the position acquiring portion 64, the inertial measurement device 62 or the like of the combine harvester 1 detects position information 99 of the combine harvester 1. The communication processing portion 65 transmits the position information 99 detected by the position acquiring portion 64, the inertial measurement device 62 or the like to the mobile communication terminal 7. The communication processing portion 72 of the mobile communication terminal 7 receives the position information 99 transmitted from the combine harvester 1. The vehicle-position acquiring portion 85 acquires the position information 99 received by the communication processing portion 72. The display processing portion 86 identifies the position of the combine harvester 1 on the basis of the position information 99 acquired by the vehicle-position acquiring portion 85 and causes the icon C1 indicating the combine harvester 1 to be displayed at the corresponding position in the map image MP on the display portion 73.

In this embodiment, when the combine harvester 1 is to perform the automated travel, the driver (operator) first causes the combine harvester 1 to manually travel along a contour 981 of the actual field 98. In the example shown in FIG. 4, the driver (operator) is causing the combine harvester 1 to manually travel counterclockwise along the contour 981 from an entrance EX1 of the field 98. The combine harvester 1 reaps unreaped grain culms on the travel route while traveling along the contour 981.

As shown in FIG. 4, if there is an obstacle SA in the field 98 along the contour 981, the driver (operator) causes the combine harvester 1 to manually travel while avoiding the obstacle SA. Specifically, the combine harvester 1 detours inward from the contour 981 along the obstacle SA.

The position acquiring portion 64, the inertial measurement device 62 or the like periodically detects the position information 99 of the combine harvester 1 during manual travel. A plurality of pieces of the position information 99 of the combine harvester 1 detected by the position acquiring portion 64, the inertial measurement device 62 or the like are sequentially transmitted to the mobile communication terminal 7.

The communication processing portion 72 of the mobile communication terminal 7 receives the plurality of pieces of position information 99 transmitted from the combine harvester 1. The vehicle-position acquiring portion 85 acquires the plurality of pieces of position information 99 received by the communication processing portion 72.

The display processing portion 86 causes a pointer 99P corresponding to each of the plurality of pieces of position information 99 to be displayed at the corresponding positions in the map image MP on the display portion 73 on the basis of the plurality of pieces of position information 99 acquired by the vehicle-position acquiring portion 85.

The field-contour setting portion 83 sets the contour 981P of the field 98 on the basis of the plurality of pieces of position information 99 acquired by the vehicle-position acquiring portion 85 and a vehicle width d of the combine harvester 1. The vehicle width d is stored in the storage portion 81, for example.

Contour Setting 1

Subsequently, an example of contour setting processing of the field 98 in this embodiment will be explained. For example, the operator performs an operation on the mobile communication terminal 7 to select four pointers 99PA, 99PB, 99PC, and 99PD out of the plurality of pointers 99P displayed on the display portion 73.

When the operation portion 74 detects the operation to select the pointers 99PA, 99PB, 99PC, and 99PD, the field-contour setting portion 83 sets a substantially rectangular frame contour 981P with the pointers 99PA, 99PB, 99PC, and 99PD as four points at the four corners, respectively. It is to be noted that the field-contour setting portion 83 may also set the substantially rectangular frame connecting pointers 99PA, 99PB, 99PC, and 99PD as the contour 981P.

The field-contour setting portion 83 may select four pointers 99P at the four corners among the plurality of pointers 99P and set the substantially rectangular frame connecting the four pointers 99P as the contour 981P.

Contour Setting 2

Subsequently, another example of the contour setting processing of the field 98 in this embodiment will be explained. For example, the display processing portion 86 calculates a trajectory of the combine harvester 1 traveling through the field 98 on the basis of the plurality of pieces of position information 99 acquired by the vehicle-position acquiring portion 85 and the vehicle width d of the combine harvester 1. The display processing portion 86 causes the calculated trajectory to be displayed by being superimposed on the map image MP on the display portion 73.

The operator, for example, performs an operation on the mobile communication terminal 7 to select the four points at the four corners of the trajectory displayed on the display portion 73. When the operation portion 74 detects the operation to select the four points at the four corners, the field-contour setting portion 83 sets the contour 981P of the substantially rectangular frame with the four points at the four corners as vertices.

The field-contour setting portion 83 may also set the contour 981P further outward from the outside of the trajectory of the combine harvester 1 in the contour setting 1 and the contour setting 2.

Once the contour 981P is set by the field-contour setting portion 83, the region setting portion 84 sets various regions inside the field 98 and outside the field 98 on the basis of the contour 981P. For example, the region setting portion 84 sets a work target region inside the field 98 where the harvesting operation by the combine harvester 1 is performed. The region setting portion 84 also sets a region not subject to the work indicating a region which is not a target for the harvesting operation by the combine harvester 1 inside the field 98 or outside the field 98. For example, the combine harvester 1 performs related works associated with the harvesting operation in the region not subject to the work.

For example, the region setting portion 84 calculates a non-travelable region S1 in which the combine harvester 1 cannot travel on the basis of the plurality of pieces of position information 99 and the contour 981P and sets it as the region not subject to the work.

Specifically, the region setting portion 84 determines whether there is the non-travelable region S1 inside the contour 981P or not.

Specifically, if the pointer 99P is located at a distance larger than a predetermined distance r1 from the contour 981P toward the inside of the field 98, the region setting portion 84 sets the non-travelable region S1. In the example shown in FIG. 5, three pointers 99P are located at positions away from the contour 981P to the inside of the field 98 by a distance larger than the predetermined distance r1. The region setting portion 84 determines that the region surrounded by the three pointers 99P and the contour 981P is the non-travelable region S1. The region setting portion 84 sets the non-travelable region S1 as the region not subject to the work.

As described above, in this embodiment, since the non-travelable region S1 is set on the basis of the contour 981P and the trajectory of the combine harvester 1, an operation by the operator to set the non-travelable region S1 is no longer necessary. Thus, the non-travelable region S1 can be set more easily.

Figure 6:
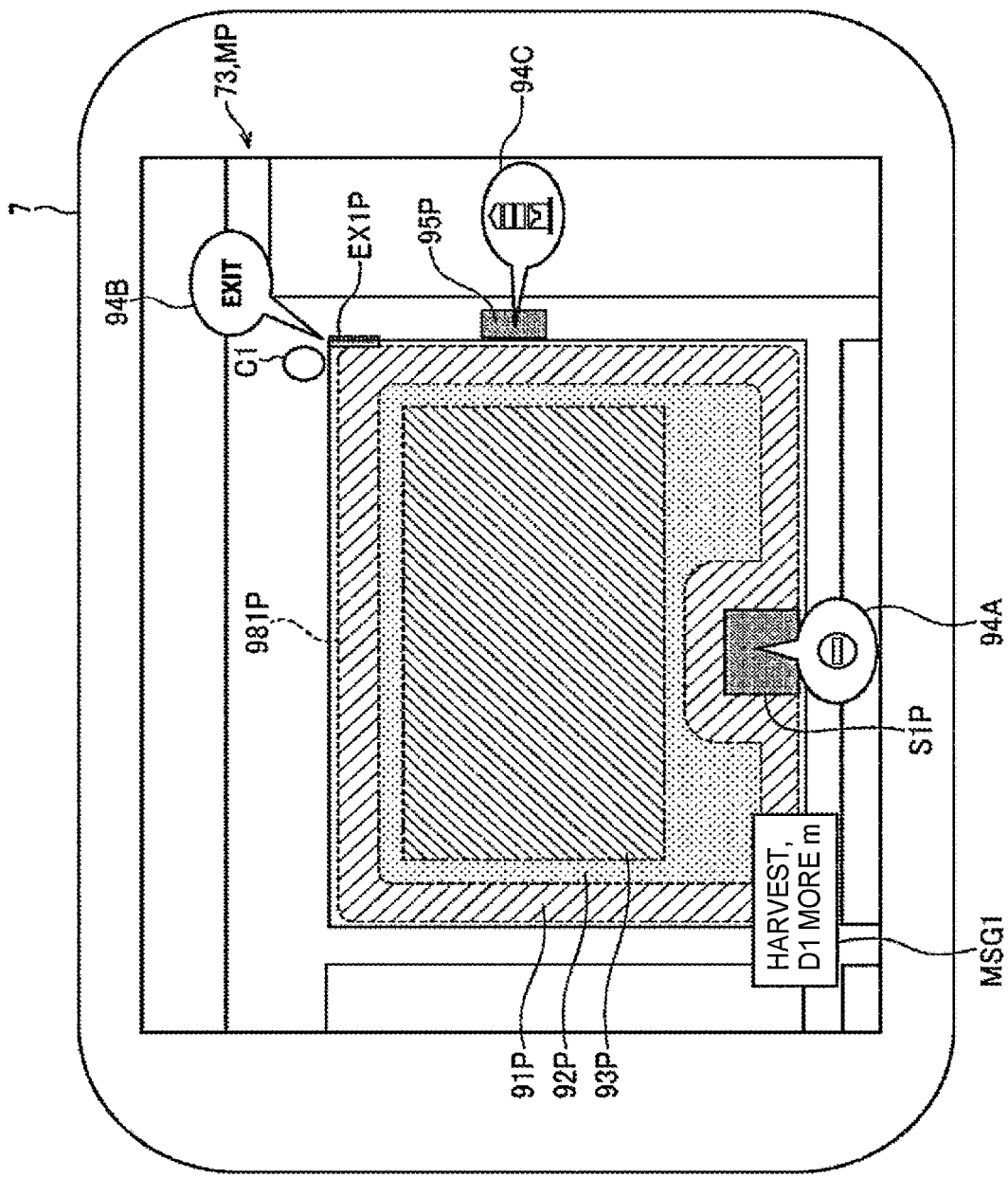
FIG. 6 is a diagram illustrating an example of various regions displayed on the display portion.

Subsequently, by referring to FIG. 6, the various other regions that are set in this embodiment will be explained. FIG. 6 is a diagram illustrating an example of the various regions displayed on the display portion 73.

For example, the region setting portion 84 sets the trajectory that the combine harvester 1 traveled while reaping the unreaped grain culms to the worked region 91. Specifically, the region setting portion 84 determines whether the combine harvester 1 has reaped the unreaped grain culms on the travel route on the basis of the detection results of the reaping sensor 68. In the example shown in FIGS. 4 to 6, the region setting portion 84 sets the trajectory traveled to set the contour 981P to the worked region 91. The worked region 91 is included in the work target region.

The display processing portion 86 causes a worked region image 91P, which indicates the worked region 91 set by the region setting portion 84, to be displayed by being superimposed on the map image MP on the display portion 73.

The region setting portion 84 also sets the unworked region 92 on the basis of the contour 981P and the worked region 91. The unworked region 92 indicates the region where there are unreaped grain culms. Specifically, the region setting portion 84 sets the region other than the worked region 91 to the unworked region 92 in the regions inside the contour 981P. The unworked region 92 is included in the work target region.

The display processing portion 86 causes an unworked region image 92P, which indicates the unworked region 92 set by the region setting portion 84, to be displayed by being superimposed on the map image MP on the display portion 73.

Furthermore, the region setting portion 84 sets an automated travel region 93 on the basis of the unworked region 92. The automated travel region 93 indicates the region where the combine harvester 1 travels automatedly. Specifically, the region setting portion 84 sets a substantially rectangular automated travel region 93 on a part of the inside of the unworked region 92. The position and the size of the automated travel region 93 is determined, for example, on the basis of the vehicle width d of the combine harvester 1.

The display processing portion 86 causes an automated-travel region image 93P, which indicates the automated travel region 93, set by the region setting portion 84, to be displayed by being superimposed on the map image MP on the display portion 73.

For example, the worked region image 91P, the unworked region image 92P, and the automated-travel region image 93P are displayed in such a way that the operator can identify each region by displaying them in different colors or the like.

It is to be noted that the region setting portion 84 does not have to set some or all of the worked region 91, the unworked region 92, and the automated travel region 93.

The region setting portion 84 also sets a relay region 95 (see FIG. 4), where a relay work is performed to allow the combine harvester 1 to continue the harvesting operation, to a region not subject to the work. The relay work includes, for example, a work of discharging crops harvested by the combine harvester 1 to a truck or the like, a refueling work to the combine harvester 1 and the like. The relay work is an example of the related works. Coordinates of the relay region 95 are stored in the storage portion 81.

For example, when the relay region 95 is to be set, the operator operates the operation portion 74 of the mobile communication terminal 7 to select a certain point on the map image MP displayed on the display portion 73. The region setting portion 84 acquires the coordinates of the point selected by the operator from the operation portion 74. The region setting portion 84 determines whether the coordinates of the selected point are located inside the contour 981P or located outside the contour 981P on the basis of the acquired coordinates and the contour 981P. If the coordinates of the selected point are located outside the contour 981P, the region setting portion 84 sets a predetermined region including the selected point to the relay region 95.

In this embodiment, the relay region 95 may be set by the operator. The relay region 95 set by the operator is, for example, at least any one of a plurality of sides constituting the field 98. Alternatively, the relay region 95 may be at least one point on one side, rather than an entire side. The region setting portion 84 acquires the coordinates of one point or one side selected by the operator from the operation portion 74 and sets the selected one point or one side to the relay region 95.

The region setting portion 84 also sets the entrance EX1 of the field 98 (see FIG. 4) to the region not subject to the work. At the entrance EX1, an entering work is performed to admit the combine harvester 1 into the field 98. The entering work is an example of the related works associated with the harvesting operations. For example, the region setting portion 84 calculates the coordinates at which the combine harvester 1 passed the contour 981P on the basis of the plurality of pieces of position information 99 and the contour 981P. The region setting portion 84 sets a predetermined region that includes the point indicated by the calculated coordinates to the entrance EX1. In the example shown in FIG. 4, the entrance EX1 is at an upper right corner of the contour 981P. The shape and the size of the entrance EX1 is determined, for example, on the basis of the vehicle width d of the combine harvester 1. In the example shown in FIG. 4, the shape of the entrance image EX1P is a substantial rectangle. The coordinates of the entrance EX1 are stored in the storage portion 81.

It is to be noted that the entrance EX1 may be set by the operator. When the operator is to set the entrance EX1, the operator operates the operation portion 74 of the mobile communication terminal 7 to select the point corresponding to the entrance EX1 in the map image MP displayed on the display portion 73. The region setting portion 84 acquires the coordinates of the point selected by the operator from the operation portion 74 and sets a predetermined region including the selected point to the entrance EX1.

Identification Image

In this embodiment, the display processing portion 86 causes an identification image 94 for the operator to identify the region not subject to the work and the field image 98P to be displayed on the display portion.

As shown in FIG. 6, the display processing portion 86 causes a non-travelable region image S1P, which indicates the non-travelable region S1, to be displayed by being superimposed on the map image MP on the display portion 73, for example. Specifically, the display processing portion 86 acquires the coordinates of the non-travelable region S1 set by the region setting portion 84. The display processing portion 86 causes the non-travelable region image S113 to be displayed at the position indicated by the acquired coordinates in the map image MP.

Furthermore, the display processing portion 86 causes a non-travelable region identification image 94A, which indicates the non-travelable region S1, to be displayed by being superimposed on the non-travelable region image S1P. The non-travelable region identification image 94A is an example of the identification image 94. The identification image 94 is displayed, for example, as a pin, an icon or the like. For example, the non-travelable region identification image 94A includes a picture depicting a "No Entry" sign.

The display processing portion 86 causes the entrance image EX1P, which indicates the entrance EX1 of the field 98, to be displayed by being superimposed on the map image MP on the display portion 73. Specifically, the display processing portion 86 acquires coordinates of the entrance EX1 stored in the storage portion 81. The display processing portion 86 causes the entrance image EX1P to be displayed at the position indicated by the acquired coordinates in the map image MP. The shape and the size of the entrance image EX1P is determined in accordance with the shape and the size of the entrance EX1, for example.

Furthermore, the display processing portion 86 causes an entrance identification image 94B, which indicates the entrance EX1, to be displayed by being superimposed on the entrance image EX1P. The entrance identification image 94B is an example of the identification image 94. For example, the entrance identification image 94B includes the characters "EXIT" indicating the entrance.

The display processing portion 86 causes a relay region image 95P, which indicates the relay region 95, to be displayed by being superimposed on the map image MP on the display portion 73. The display processing portion 86 acquires coordinates of the relay region 95 stored in the storage portion 81, for example. The display processing portion 86 causes the relay region image 95P to be displayed at the position indicated by the acquired coordinates. In the example shown in FIG. 6, the shape of the relay region image 95P is a substantial rectangle.

Furthermore, the display processing portion 86 causes a relay-region identification image 94C, which indicates the relay region 95, to be displayed by being superimposed on the relay region image 95P. The relay-region identification image 94C is an example of the identification image 94. For example, the relay-region identification image 94C includes a picture of a "silo".

As described above, the various regions not subject to the work are set on the basis of the trajectory traveled by the combine harvester 1, and the identification image 94 is added to each of the images indicating the regions not subject to the work so that it becomes easier for the operator to visually recognize each region not subject to the work inside the field and outside the field.

For example, by adding the non-travelable region identification image 94A to the non-travelable region identification image S1P, the operator can easily recognize the non-travelable region S1, by adding the entrance identification image 94B to the entrance image EX1P, the operator can easily recognize the entrance EX1, and by adding the relay-region identification image 94C to the relay region image 95P, the operator can easily recognize the relay region 95.

It is to be noted that a display format of the identification image 94 is not limited to the above. Specifically, characters or pictures included in the identification image 94 are not particularly limited. Colors, designs, pattern, fonts, sizes and the like of the characters or pictures included in the identification image 94 are not particularly limited, either.

For example, the display format of the identification image 94 can be changed by the operator's changing operation. The changing operation refers to an operation in which the operator instructs the operation portion 74 of the mobile communication terminal 7 to change the display format of the identification image 94.

Specifically, when the operator performs the changing operation, the operator selects a selection identification image from the identification images 94 displayed on the display portion 73. For example, when the operator taps one of the identification images 94 displayed on the display portion 73, the tapped identification image 94 is selected as the selected identification image. The display processing portion 86 then causes a setting screen that allows the operator to set the display format of the selected identification image to be displayed. For example, when the operator selects various settings displayed on the setting screen by tapping, the display processing portion 86 causes the identification image 94 that reflects the selected setting contents to be displayed on the display portion 73.

In this embodiment, the display format of the identification image 94 includes, for example, highlighted display in which the selected identification image 94 is displayed with more highlight than identification images 94 other than the selected identification image. The highlighted display includes, for example, blinking display. Specifically, when the operator selects the setting for highlighted display among the various settings displayed on the setting screen, the display processing portion 86 causes the identification image 94 to be displayed with highlight. By highlighting the identification image 94, it becomes easier to draw the operator's attention to the region corresponding to the highlighted identification image 94.

Figure 7:
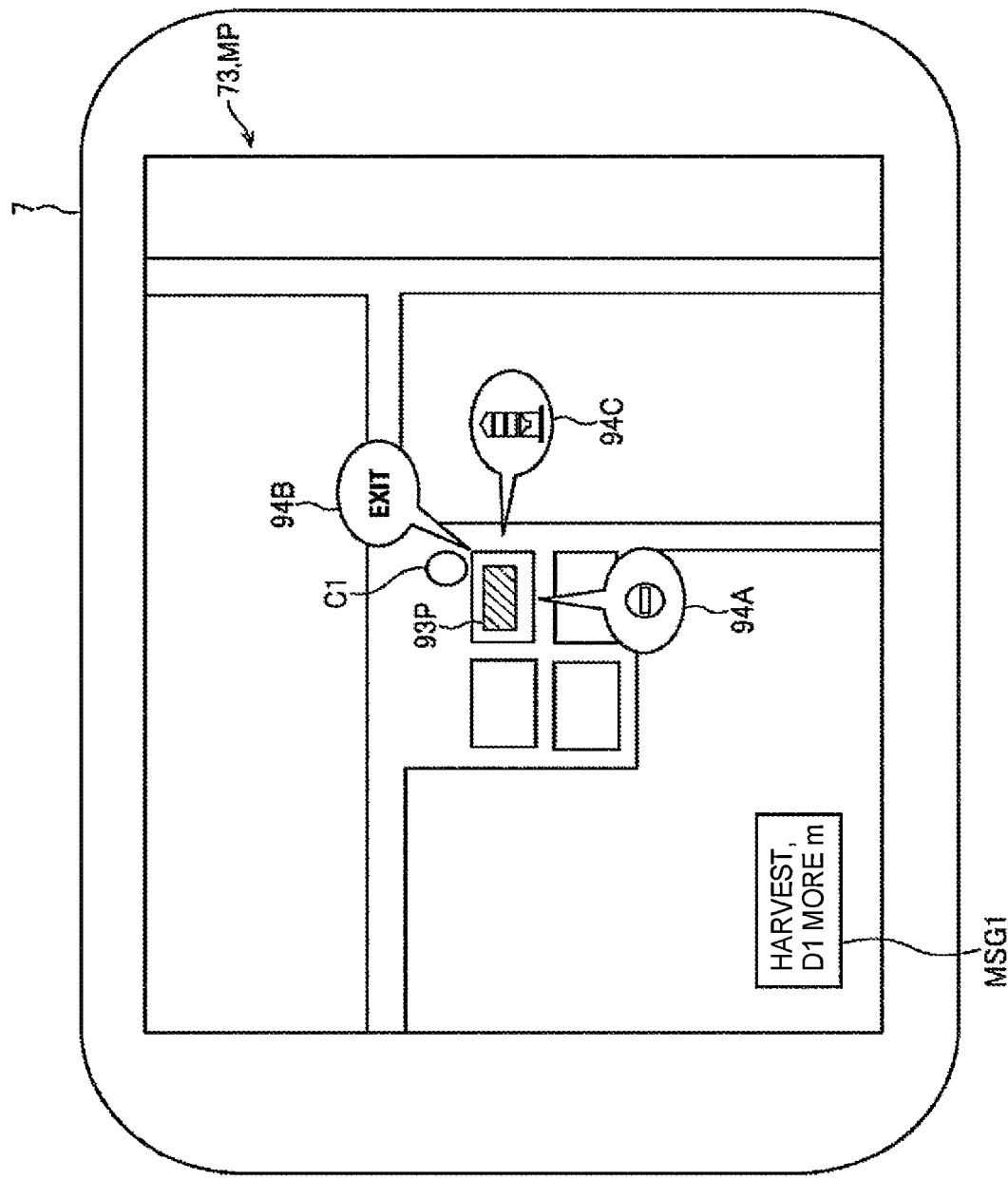
FIG. 7 is a diagram illustrating a display portion on which an identification image is displayed.

Subsequently, the display of the identification image 94 will be explained in more detail with reference to FIG. 7. FIG. 7 is a diagram illustrating a display portion 73 on which the identification image 94 is displayed. The map image MP shown in FIG. 7 has the map image MP shown in FIG. 6 reduced and displayed with a wider range.

For example, if the operator performs a pinch-in operation on the map image MP shown in FIG. 6, the map image MP shown in FIG. 7 is displayed on the display portion 73. Specifically, when the operation portion 74 detects the pinch-in operation, the display processing portion 86 reduces the displayed map image MP and causes it to be displayed as a new map image MP on the display portion 73 together with an image showing a range outside the displayed map image MP. The pinch-in operation is an example of a reduction operation that reduces the map image MP. It is to be noted that, when the map image MP is to be enlarged, the operator, for example, performs a pinch-out operation of the map image MP. The pinch-out operation is an example of an enlargement operation that enlarges the map image MP. The enlarging and reducing operations are examples of scale change operations, respectively. In this embodiment, the reduction of the map image MP may be performed by operations other than the pinch-in operation. Moreover, the enlargement of the map image MP may be performed by an operation other than the pinch-out operation.

In the map image MP shown in FIG. 7, the automated-travel region image 93P, the non-travelable region identification image 94A, the entrance identification image 94B, and the relay-region identification image 94C are displayed on the display portion 73. On the other hand, the worked region image 91P, the unworked region image 92P, the non-travelable region image S1P, the entrance image EX1P, and the relay region image 95P are too small for the map image MP shown in FIG. 7 and are not displayed on the display portion 73.

Specifically, the display processing portion 86 reduces the automated-travel region image 93P in accordance with the reduction of the map image MP and causes it to be displayed on the display portion 73. On the other hand, if the worked region image 91P, the unworked region image 92P, the non-travelable region image S1P, the entrance image EX1P, and the relay region image 95P are reduced in size in accordance with the reduction of the map image MP, they cannot be displayed on the display portion 73 and thus, the display processing portion 86 does not display the worked region image 91P, the unworked region image 92P, the non-travelable region image S1P, the entrance image EX1P or the relay region image 95P.

The display processing portion 86 also causes the non-travelable region identification image 94A, the entrance identification image 94B, and the relay-region identification image 94C to be displayed on the display portion 73 without reducing the size in accordance with the reduction of the map image MP. Therefore, the sizes of the non-travelable region identification image 94A, the entrance identification image 94B, and relay-region identification image 94C shown in FIG. 7 are the same as those of the non-travelable region identification image 94A, the entrance identification image 94B, and the relay-region identification image 94C shown in FIG. 6.

It is to be noted that, when the map image MP is enlarged and displayed, the display processing portion 86 causes the non-travelable region identification image 94A, the entrance identification image 94B, and the relay-region identification image 94C in a predetermined size to be displayed similarly to the case where the map image MP is reduced and displayed. In other words, the display processing portion 86 causes the non-travelable region identification image 94A, the entrance identification image 94B, and the relay-region identification image 94C to be displayed at a fixed ratio on the display portion 73, regardless of enlargement or reduction of the map image MP. Therefore, even when the map image MP is enlarged or reduced in size, it is easier for the operator to recognize the region not subject to the work.

Subsequently, with reference to FIGS. 2, 3, 6, and 7 and FIG. 7, a travel distance display which is displayed on the display portion 73 will be explained.

In this embodiment, the mobile communication terminal 7 presents to the operator a distance for which the harvesting operation with the combine harvester 1 can be continued, on the basis of the detection results of the yield sensor 69 provided in the combine harvester 1.

For example, the yield-information acquiring portion 87 shown in FIG. 3 acquires the yield information generated by the control portion 50 shown in FIG. 2. For example, the control portion 50 transmits the generated yield information to the mobile communication terminal 7 via the communication processing portion 65 and the communication antenna 63.

The yield-information acquiring portion 87 receives and acquires the yield information transmitted from the combine harvester 1 via the communication antenna 71 and the communication processing portion 72.

The calculating portion 88 calculates a storage volume Q1, which indicates an amount of grains stored in the grain tank 400, on the basis of the yield information acquired by the yield-information acquiring portion 87. Specifically, the calculating portion 88 calculates the storage volume Q1 by sequentially adding up the yield information acquired by the yield-information acquiring portion 87.

The calculating portion 88 calculates remaining capacity Q3 of the grain tank 400 on the basis of the capacity Q2 and the storage volume Q1 of the grain tank 400. The remaining capacity Q3 is calculated by subtracting the storage volume Q1 from the capacity Q2. The capacity Q2 of the grain tank 400 is stored, for example, in the storage portion 55 or the control portion 80.

Furthermore, the calculating portion 88 calculates a travelable distance D1 for which the combine harvester 1 can travel before the storage volume Q1 reaches the tank capacity Q2 on the basis of the remaining capacity Q3 of the grain tank 400 and harvestable volume information indicating an amount of grains harvested when the combine harvester 1 travels a unit distance. The harvestable volume information is stored, for example, in the storage portion 55 or the control portion 80. It is to be noted that the harvestable volume information may be calculated by the calculating portion 88. For example, the calculating portion 88 calculates the distance traveled by the combine harvester 1 on the basis of the plurality of pieces of position information 99. The calculating portion 88 calculates the harvestable volume information by dividing the storage volume Q1 by the travel distance.

The calculating portion 88 calculates the travelable distance D1 by dividing the remaining capacity Q3 by the harvestable volume information.

As shown in FIGS. 6 and 7, the display processing portion 86 causes a message image MSG1, which indicates the travelable distance D1 calculated by the calculating portion 88, to be displayed by being superimposed on the map image MP on the display portion 73. The message image MSG1 shown in FIGS. 6 and 7 includes the message "Harvest, D1 more m". It is to be noted that the messages included in the message image MSG1 are not limited to those shown in FIGS. 6 and 7. Other than the message image MSG1, the display processing portion 86 may also cause a meter image or the like indicating the travelable distance D1 to be displayed on the display portion 73. When the travelable distance D1 is displayed on the display portion 73, the operator can visually recognize the distance for which the harvesting operation can be continued. Therefore, efficiency of the harvesting operation is improved.

Figure 8:
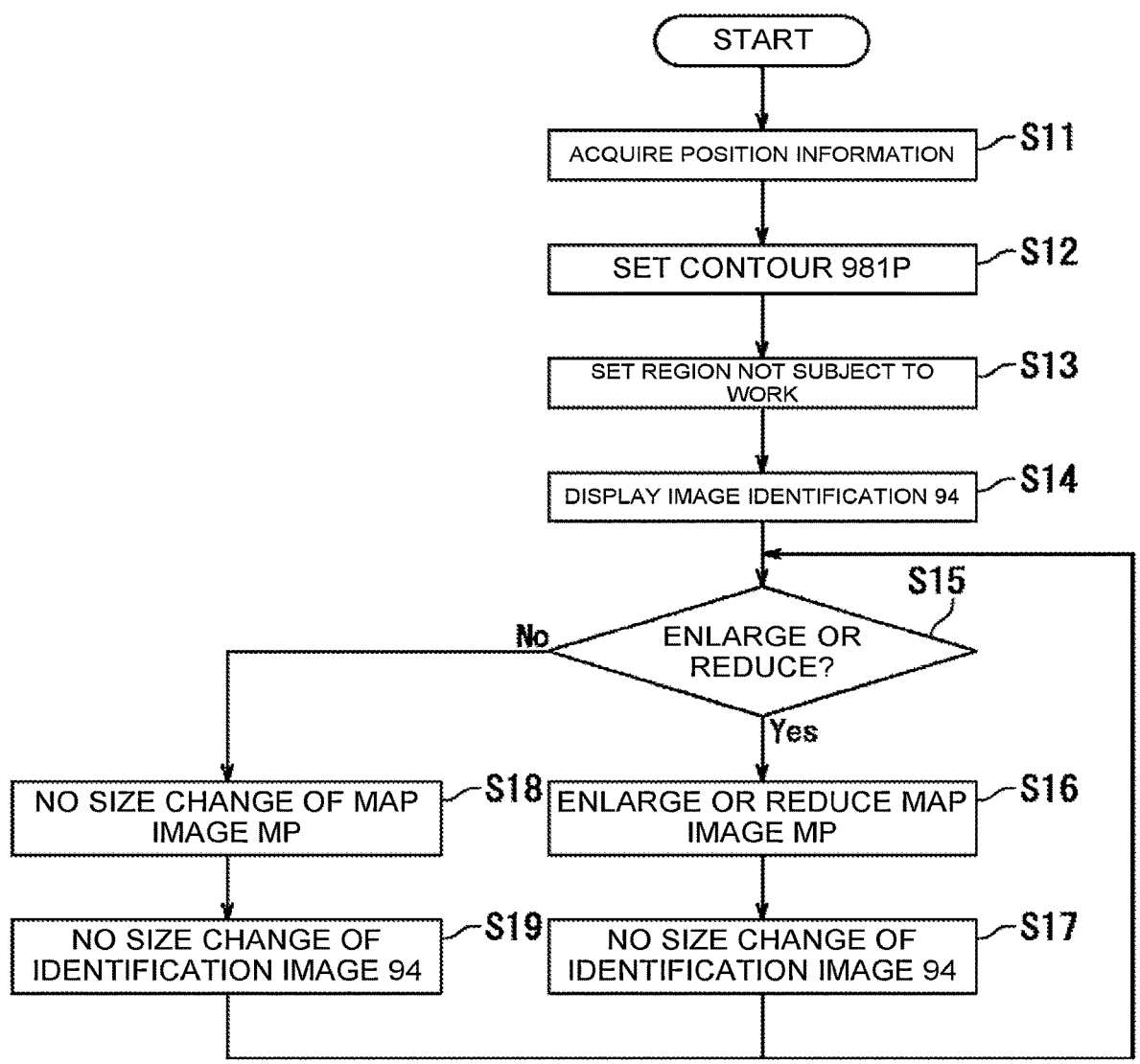
FIG. 8 is a flowchart showing a display method according to this embodiment.

Subsequently, a display method according to this embodiment will be explained with reference to FIG. 8. FIG. 8 is a flowchart showing the display method according to this embodiment.

First, the vehicle-position acquiring portion 85 acquires the position information 99 of the combine harvester 1 (Step S11).

The field-contour setting portion 83 sets the contour 981P of the field 98 on the basis of the plurality of pieces of position information 99 acquired by the vehicle-position acquiring portion 85 (Step S12).

The region setting portion 84 sets a region not subject to the work indicating a region which is not a target for the harvesting operation by the combine harvester 1 inside the field 98 or outside the field 98 on the basis of the contour 981P (Step S13). For example, if the pointer 99P corresponding to the position information 99 is located at a position farther than the predetermined distance r1 from the contour 981P toward the inside of the field 98, the region setting portion 84 sets the non-travelable region S1.

The display processing portion 86 causes an identification image 94 to identify the region not subject to the work, to be displayed on the display portion 73 (Step S14). For example, when the non-travelable region S1 is set, the display processing portion 86 causes the non-travelable region identification image 94A to be displayed on the display portion 73.

The operation portion 74 detects the scale change operation by the operator (Step S15). If the operation portion 74 detects an enlargement operation to enlarge the map image MP or a reduction operation to reduce the map image MP (Yes at Step S15), the display processing portion 86 enlarges or reduces the map image MP and causes it to be displayed on the display portion 73 (Step S16).

Subsequently, the display processing portion 86 causes the identification image 94 to be displayed at a fixed ratio on the display portion 73, regardless of enlargement or reduction of the map image MP (Step S17). In other words, the identification image 94 is displayed at the same size as that of the map image MP before enlargement or reduction. The operation portion 74 detects a new scale change operation by the operator (Step S15).

On the other hand, if the operation portion 74 detects neither enlargement nor reduction operation (No at Step S15), the display processing portion 86 does not enlarge or reduce the map image MP but continues displaying the map image MP on the display portion 73 (Step S18).

Subsequently, the display processing portion 86 causes the identification image 94 to be displayed at a fixed ratio on the display portion 73 (Step S19). The operation portion 74 detects the scale change operation by the operator (Step S15).

The embodiment of the present invention has been described with reference to the accompanying drawings (FIGS. 1 to 8). However, the present invention is not limited to the embodiment described above but can be worked in various modes in a range not departing from the gist thereof. In addition, the plurality of constituent elements disclosed in the above embodiment may be modified as appropriate. For example, one constituent element of all the constituent elements shown in one embodiment may be added to the constituent element of another embodiment, or some constituent elements of all the constituent elements shown in one embodiment may be removed from the embodiment.

The drawings schematically illustrate mainly each of the constituent elements in order to facilitate understanding of the invention, and a thickness, a length, the number, an interval and the like of each of the illustrated constituent elements may be different from the actual ones due to convenience of the drawings. In addition, it is needless to say that the configuration of each constituent element shown in the above embodiment is merely an example and is not particularly limited, and various modifications may be made without substantially departing from the effect of the present invention.

INDUSTRIAL APPLICABILITY

The present invention can be used in the field of agricultural vehicles.

REFERENCE SIGNS LIST

1 Combine harvester (work vehicle)
7 Mobile communication terminal
69 Yield sensor
73 Display portion
83 Field-contour setting portion
84 Region setting portion
85 Vehicle-position acquiring portion
86 Display processing portion
87 Yield-information acquiring portion
88 Calculating portion
94 Identification image
94A Non-travelable region identification image (identification image)
94B: Entrance identification image (identification image)
94C Relay-region identification image (identification image)
95 Relay region
98 Field
98P Field image
99 Position information
101 Traveling machine body
102 Traveling device
200 Reaping device
300 Threshing device
400 Grain tank
981P Contour
D1 Travelable distance
EX1 Entrance
Q1 Storage volume
Q2 Capacity
S1 Non-travelable region

The invention claimed is:

1. A control device, comprising:
a vehicle-position acquiring portion which acquires position information indicating a position of a work vehicle traveling on a field;
a field-contour setting portion which sets a contour of the field on the basis of a plurality of pieces of the position information;
a region setting portion which determines and sets a first region not subject to work by the work vehicle on the basis of the contour, wherein the first region is excluded as a work target of the work vehicle, wherein the first region is situated inside the field or outside the field, and includes at least one non-travelable region, and
a display processing portion that initiates display of a field image showing the field and a plurality of identification images that identify the first region on a display portion during work performance of the work vehicle, wherein a character string or an icon corresponding to the at least one non-travelable region is superimposed on the identification image for the at least one non-travelable region.

2. The control device according to claim 1, wherein the region setting portion further calculates the at least one non-travelable region in which the work vehicle cannot travel on the basis of the plurality of pieces of position information and the contour and sets the non-travelable region as part of the first region.

3. The control device according to claim 1, wherein the region setting portion sets an entrance of the field as part of the first region.

4. The control device according to claim 1, wherein the region setting portion sets a relay region as part of the first region, wherein the relay region is where relay work is performed enabling the work vehicle to continue work performance.

5. The control device according to claim 1, wherein the display processing portion causes the at least one identification image to be displayed at a fixed ratio on the display portion, regardless of enlargement or reduction of the field image.

6. The control device according to claim 1, wherein the display processing portion causes a selected identification image selected from the plurality of the identification images to be displayed with more highlight than other identification images in the plurality of identification images.

7. The control device according to claim 1, further comprising:
a yield-information acquiring portion which acquires yield information indicating an amount of grains harvested by the work vehicle when performing a harvesting operation; and
a calculating portion which calculates a storage volume of a tank in which the grains are stored on the basis of the yield information, wherein
the calculating portion calculates a work vehicle travelable distance at which the storage volume reaches a capacity of the tank on the basis of the calculated storage volume, the tank capacity, and harvestable volume information indicating an amount of grains harvested when the work vehicle travels a unit distance; and
the display processing portion further initiates display of the travelable distance on the display portion.

8. A work vehicle comprising:
the control device according to claim 1;
a traveling machine body on which the control device is disposed;
a traveling device disposed below the traveling machine body, supports the traveling machine body, and travels on a field;
a reaping device disposed on the traveling machine body and reaps unreaped grain culms in the field; and
a threshing device which threshes reaped grain culms reaped by the reaping device, wherein
the control device controls the traveling device, the reaping device, and the threshing device.

* * * * *